United States Patent
Lee et al.

(10) Patent No.: US 7,181,114 B2
(45) Date of Patent: Feb. 20, 2007

(54) WAVEGUIDE TYPE OPTICAL DEVICE USING LARGE THIRD ORDER NON-LINEARITY OPTICAL MATERIAL AND METHOD FOR OPERATING THE SAME

(75) Inventors: Taek-Sung Lee, Seoul (KR); Kyeong Seok Lee, Seoul (KR); Won-Mok Kim, Seoul (KR); Byung-Ki Cheong, Seoul (KR); In-Ho Kim, Seoul (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 10/987,709

(22) Filed: Nov. 12, 2004

(65) Prior Publication Data

US 2005/0105864 A1    May 19, 2005

(30) Foreign Application Priority Data

Nov. 14, 2003  (KR) .................... 10-2003-0080725

(51) Int. Cl.
*G02B 6/26* (2006.01)

(52) U.S. Cl. .................................. 385/122; 385/42
(58) Field of Classification Search ............... None
See application file for complete search history.

(56) References Cited

U.S. PATENT DOCUMENTS

| | | | | |
|---|---|---|---|---|
| 4,887,884 A | * | 12/1989 | Hayden | 385/1 |
| 4,941,725 A | * | 7/1990 | Normandin | 385/1 |
| 5,535,001 A | * | 7/1996 | Tajima | 356/477 |
| 6,081,634 A | * | 6/2000 | Attard | 385/16 |
| 6,792,167 B2 | * | 9/2004 | Honda et al. | 385/5 |
| 6,872,794 B2 | * | 3/2005 | Zappettini et al. | 526/346 |
| 6,904,187 B2 | * | 6/2005 | Fischer et al. | 385/5 |

OTHER PUBLICATIONS

R. K. Jain et al. Degenerate four-wave mixing near the band gap of semiconductors. Applied Physics Letters, vol. 35 No. 6, pp. 454-456, Sep. 1979.*

(Continued)

*Primary Examiner*—Sung Pak
*Assistant Examiner*—Mike Stahl
(74) *Attorney, Agent, or Firm*—Ostrolenk, Faber, Gerb & Soffen, LLP

(57) ABSTRACT

Disclosed is a waveguide type optical device utilizing a nonlinear refractive index change according to a large $3^{rd}$ order nonlinear optical phenomenon. The waveguide type optical device includes a signal beam waveguide through which a signal beam propagates; and a pump beam waveguide through which a pump beam propagates, wherein the pump beam waveguide is disposed adjacent to the signal beam waveguide so that the pump beam can be coupled to the signal beam waveguide, the signal beam waveguide is made of nonlinear optical materials with large $3^{rd}$ order nonlinear optical property and the pump beam waveguide is made of linear optical materials, and the wavelength range of the signal beam is different from that of the pump beam. By such a structure, the pump beam is coupled to one arm of the signal beam waveguide, thereby generating a $3^{rd}$ nonlinear phenomenon on one arm of the waveguide through which the signal beam passes. Therefore, the waveguide optical device which implements an all-optical communication device operating as an optical device and can be integrated is provided.

8 Claims, 4 Drawing Sheets

OTHER PUBLICATIONS

J. Olivares et al. Large enhancement of the third-order optical susceptibility in Cu-sillca composites produced by low-energy high-current ion implantation. Applied Physics Letters, vol. 90 No. 2, pp. 1064-1066, Jul. 2001.*

R. M. Geatches et al. Reduced-power semiconductor all-optical switch design. IEE Proc. Optoelectronics, vol. 144 No. 1, pp. 2-7, Feb. 1997.*

Y. Wu et al. A new all-optical switching device by using the nonlinear Mach-Zehnder interferometer with a control waveguide. CLEO/Pacific Rim 2003, vol. 1, p. 292, Dec. 2003.*

F. Di Pasquale et al. Pump controlled all-optical switching by using high-concentration Er3+ doped nonlinear waveguides. Electronics Letters, vol. 30 No. 3, pp. 232-233, Feb. 1994.*

P. A. Wolff et al. Novel, free-carrier-induced optical non-linearities of narrow-gap semiconductors. Semiconductor Science and Technology, vol. 5 No. 3S, pp. S57-S67, Mar. 1990.*

* cited by examiner

WAVEGUIDE TYPE OPTICAL DEVICE USING LARGE THIRD ORDER NON-LINEARITY OPTICAL MATERIAL AND METHOD FOR OPERATING THE SAME

BACKGROUND OF THE INVENTION

1. Field of the Invention

The present invention relates to a waveguide type optical device, and particularly, to an optical device using $3^{rd}$ order nonlinear optical material.

2. Description of the Background Art

In order to implement an all-optical device such as optical switches and optical modulators for data processing at higher speed, nonlinear refractive index change, one of $3^{rd}$ order nonlinear optical effects, can be used. In the phenomenon, refractive index of a medium is changed due to change of incident light intensity.

The $3^{rd}$ order nonlinear optical effect in a medium can be classified into two kinds depending on its generation mechanism. In one of them, $3^{rd}$ order nonlinear optical effect is achieved in a state that laser beam incident on an optical material is little absorbed. In this type, not resonance such as excitation of a material due to light absorption, but 'non-resonance effect', such as optical Kerr effect in a silica glass, is used. This type of $3^{rd}$ order nonlinear optical effect has advantages such as less light absorption, fast response time, but it also has disadvantages of very small $3^{rd}$ order nonlinear optical coefficient value.

To overcome such a disadvantage, some devices using a silica optical fiber as a waveguide have been proposed, so that incident light reacts in a long distance in a medium. However, such devices are impossible to be integrated because of its long waveguide. Also, the devices are very sensitive to temperature change, which deteriorates device performance, and thus have poor industrial utility.

In the other type of $3^{rd}$ order nonlinear optical effect, incident light of a vicinity of an absorption edge of an optical material or incident light having a wavelength close to excited resonance wavelength of a semiconductor is made to react to a nonlinear material, so that a nonlinear refractive index is induced by a resonance phenomenon. Because a very large $3^{rd}$ order nonlinear optical effect can be induced even with small intensity of light in this type, a large refractive index change can be generated even with a low power. However, this type is disadvantageous in that light cannot be guided in a long distance because linear absorption of light in a material is great, and that its response time is slower compared to the non-resonance type.

Of materials for generating a $3^{rd}$ order nonlinear optical phenomenon by resonance, a composite film where metal particles or semiconductor particles are dispersed in a transparent dielectric, a semiconductor or a polymer matrix is known for its large $3^{rd}$ order nonlinear optical susceptibility ($X^{(3)}$) and its response time similar to that of the non-resonance effect. Composite material obtained by dispersing metal or semiconductor particles of nanometer size in a transparent dielectric matrix such as a silica or the like is advantageous in that it shows a very large $3^{rd}$ order nonlinear optical susceptibility value via a dielectric confinement effect and a quantum confinement effect, and its linear and nonlinear optical properties can be easily tailored through various combinations between constituents.

In a composite material with semiconductor nano-particle dispersion, the quantum confinement effect is dominant mechanism for $3^{rd}$ order nonlinear optical phenomenon. This composite material is disadvantageous in that an operation speed is limited to tens of pico seconds at best because it requires interband transition of a real charge carrier, but is advantageous in that a $3^{rd}$ order nonlinear susceptibility is large and its operation wavelength (band) can be tailored within a relatively large wavelength range only by changing its particle size.

Meanwhile, a composite material with metal nano-particle dispersion utilizes $3^{rd}$ order nonlinear optical phenomenon caused by a dielectric confinement effect in which local electric field around the metal particles is enhanced by a surface plasmon resonance. This type of composite material has somewhat restrictive in changing operation wavelength compared to the composite materials made by dispersing semiconductor particles. This composite material is advantageous in that its $3^{rd}$ order nonlinear optical susceptibility value is similar to that of the semiconductor-dispersed composite material, and that it has a response time of pico seconds or less due to an instant-reaction characteristic of an optical Kerr effect, and that it is chemically stable as well as stubborn to laser irradiation.

Accordingly, a very large $3^{rd}$ order nonlinear optical phenomenon is generated by using such materials, thereby making it possible to give body to an integrated optical device operable with low power. Also, because of its fast response time, the composite materials are promising candidate material for various signal processing devices for high speed optical communication of next generation such as optical switch, optical modulator and logic devices for optical computing.

However, $3^{rd}$ order nonlinear optical materials made of nano-composite using semiconductor nano-particles absorb light of the corresponding wavelength for interband transition of electrons. Also, the nano-composite material using metal nano-particles disadvantageously has large absorption of light in the wavelength region of surface plasmon resonance in which $3^{rd}$ order nonlinear optical effect is maximized. The absorption makes actual embodiment of a waveguide type optical device very difficult.

FIG. 1 is a graph showing an absorption coefficient change as a function of wavelength for a nano-composite material ($Au$—$SiO_2$) obtained by dispersing gold (Au) nano-particles in a silica matrix as one example of an optical material generating a large $3^{rd}$ order nonlinear optical phenomenon.

As shown in FIG. 1, the gold-silica ($Au$—$SiO_2$) nano-composite thin film has large absorption coefficient in a wavelength shorter than 700 nanometer, but has very small absorption coefficient in an infrared region above 700 nanometer. A peak of the absorption coefficient, shown in a wavelength of about 500 nanometer is generated due to surface plasmon resonance phenomenon. Namely, it means that if a laser beam with wavelength of about 500 nanometer is used, this material can show a large $3^{rd}$ order nonlinear optical effect. Such composite material absorbs little light in a near infrared region, in which the band of communication wavelength generally used is located. However, because the band of communication wavelength is apart from the resonance wavelength of the material, a refractive index change due to a $3^{rd}$ order nonlinear optical effect is not large.

Because the gold-silica composite material has a very large $3^{rd}$ order nonlinear optical coefficient compared to that of silica based material commonly used as an optical fiber, it can be used for manufacturing a waveguide type optical device.

Typical example of such an optical device is a Mach-Zehnder interferometer optical switch shown in FIG. 2. In this switch, since the material shows large absorption of a guided light with wavelength at which the material has large $3^{rd}$ order nonlinearity, a waveguide made of such nanocomposite material as a whole cannot guide a light with such wavelength.

Theoretically, as shown in FIG. 2, it is possible to insert a material with large $3^{rd}$ order nonlinearity 3 into only a part of the waveguide. Through following mechanism, a refractive index is possibly changed by only an incident beam. The incident beam 5 is entered at an input port 2a and is split into two beams at a junction point 2c, and the two beams respectively direct through different arms. When the beams meet with each other at another junction point 2d, if their phases coincide with each other, a constructive interference occurs, thereby outputting a signal beam from an output port 2f. On the contrary, if the phases of two beams are opposite at the moment of the interference, thereby causing a destructive interference, no light is outputted from the output port 2f.

The length of a waveguide and the distribution of refractive index in Mach-Zehnder are designed such that if a beam passing through an arm including a nonlinear optical material part 3 has sufficiently low intensity, no change in refractive index in the nonlinear optical material part 3 is induced, resulting in a constructive interference at the junction point 2d where two beams meet with each other, thereby outputting an signal beam 5a. In contrast, if the length of the waveguide and the distribution of refractive index (distribution) are designed such that the refractive index is changed by a light with intensity large enough to cause a $3^{rd}$ order nonlinear optical phenomenon while the beam passes through the part 3, thus a destructive interference occurs at the point 2d, thereby outputting no signal beam 5a. By such a design, an optical switching device can be implemented.

As shown in FIG. 2, a waveguide type optical device may be designed such that a signal beam 5 and a pump beam 6 are separately inserted into the waveguide and a switching operation is made by constructive/destructive interference at an output port 2f of the waveguide depending on whether the pump beam exists or not, while no change in refractive index occurring at the part made of a nonlinear material by an intensity change of incident light. If there is no pump beam 6, a signal beam 5 is emerged from the output port 2f with constructive interference. If there is a pump beam causing a $3^{rd}$ order nonlinear optical phenomenon, destructive interference of the signal beam occurs at the output port 2f of the waveguide, thereby outputting no signal beam. Such a pump beam can be simultaneously inserted into the input port 2a together with the signal beam, and can be inserted into a separate waveguide 2b.

Switching operation is theoretically possible in such an optical switching device having the above described structure. However, its manufacturing is practically difficult since the waveguide should include a $3^{rd}$ order nonlinear optical material part 3 therein. This is because, in order to make no signal beam loss on a waveguide as well as no change in phase of propagating beam by geometrical effect, a refractive index of a waveguide part 2 formed of a general waveguide material such as a silica or polymer with little absorption of both signal beam and pump beam should be matched with that of the waveguide part 3 formed of a $3^{rd}$ order nonlinear optical material and the two parts 2 and 3 should be connected without interface ununiformity.

However, matching the refractive indices is very difficult. Furthermore, even though the refractive index matching is realized, it is almost impossible to remove interfacial loss in a manufacturing process. Accordingly, it is very difficult to implement the $3^{rd}$ order nonlinear optical switching device shown in FIG. 2.

Accordingly, the necessity has been proposed for an effective all-optical communication device as follows: overcoming difficulties generated by forming a waveguide in conventional manufacturing processes using two different kinds of materials for one waveguide, and removing refractive index mismatch between the different kinds of materials and a loss of a signal beam due to interface ununiformity.

SUMMARY OF THE INVENTION

Therefore, an object of the present invention is to provide a new waveguide type optical device using a material having a large $3^{rd}$ order nonlinear optical property.

Another object of the present invention is to provide a waveguide type optical device in which interfacial ununiformity between different kinds of materials in a waveguide is prevented from occurring.

Another object of the present invention is to provide a unit device for all-optical communications, such as an optical switch and an optical modulator for an integrated optical device which can be manufactured through easy manufacturing processes and can be efficiently operated by minimizing a loss of a signal beam.

To achieve these and other advantages and in accordance with the purpose of the present invention, as embodied and broadly described herein, present invention provides an waveguide type optical device formed by using a nonlinear optical material having a large $3^{rd}$ order nonlinear optical property by a dielectric confinement effect in a dielectric or a semiconductor matrix with metal nano-particles dispersion, or using a nonlinear optical material having a large $3^{rd}$ order nonlinear optical characteristic by a quantum confinement effect in a dielectric matrix with semiconductor nano-particles dispersion.

According to the present invention, a pump beam entered into a waveguide made of linear optical material which absorbs a very little or no light of pump beam wavelength is coupled to another waveguide made of a nonlinear optical material having a large $3^{rd}$ order nonlinear optical property, so that the pump beam coupled to the waveguide constructed of the nonlinear optical material generates a large $3^{rd}$ order nonlinear optical phenomenon by a resonance reaction between the material and the pump beam in the waveguide, thereby implementing optical modulation or optical switching.

In accordance with the present invention, there is provided a waveguide type optical device comprising: a signal beam waveguide through which a signal beam propagates; and a pump beam waveguide through which a pump beam propagates, wherein at least a part of the pump beam waveguide is arranged adjacent to at least a part of the signal beam waveguide so that the pump beam can be coupled to the signal beam waveguide, the signal beam waveguide and the pump beam waveguide are made of different kinds of materials, and the signal beam and the pump beam are different in their wavelength regions.

The pump beam has wavelength and intensity suitable to change a refractive index of nonlinear optical material by generating a $3^{rd}$ order nonlinear optical phenomenon at a waveguide part constructed of a $3^{rd}$ order nonlinear optical material, (in case of the material related to FIG. 1, a wavelength of pump beam is about 500 nm.). And the signal beam includes a signal for transmitting information (currently, a wavelength of signal beam for usual optical communication is in the range from (within) about 1300 nm to 1600 nm.).

The signal beam waveguide is formed of a $3^{rd}$ order nonlinear optical material with little absorption of light in signal beam wavelength (preferably, absorption loss per unit length is 4.3 dB or less so that power of an output beam with respect to that of an incident beam becomes larger than 1/e.) and generating a large $3^{rd}$ order nonlinear optical phenomenon in pump beam wavelength.

The pump beam waveguide is formed of a general waveguide material without optical nonlinearity, wherein the general waveguide material absorbs nearly little amount of light in wavelength ranges of both the pump and the signal beam (preferably, absorption loss per unit length is 4.3 dB or less so that power of an output beam with respect to that of an incident beam becomes larger than 1/e.).

The $3^{rd}$ order nonlinear optical material is a material having a large $3^{rd}$ order nonlinear optical susceptibility, and preferably, its nonlinear optical susceptibility is at least $10^{-10}$ esu so that a phase difference of 180 degree can be implemented in the wavelength type optical device. This value is obtained on the assumption that a power of the pump beam is maximum Watt order when being converted into CW, a cross section is $um^2$ unit, and a coupling length is mm unit. In case of using a pulse laser, a $3^{rd}$ order nonlinear optical susceptibility value smaller than that mentioned above may be enough for the operation of the waveguide type optical device.

Since the pump beam waveguide absorbs nearly little amount of light in wavelength ranges of both the pump and the signal beam, a pump beam can propagate through the pump beam waveguide and transfer to a signal beam waveguide by coupling, resulting in change in a refractive index by a $3^{rd}$ order nonlinear optical phenomenon in the signal beam waveguide. Using this refractive index change, the waveguide type optical device can function as optical modulator or optical switch.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention together with the description serving to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
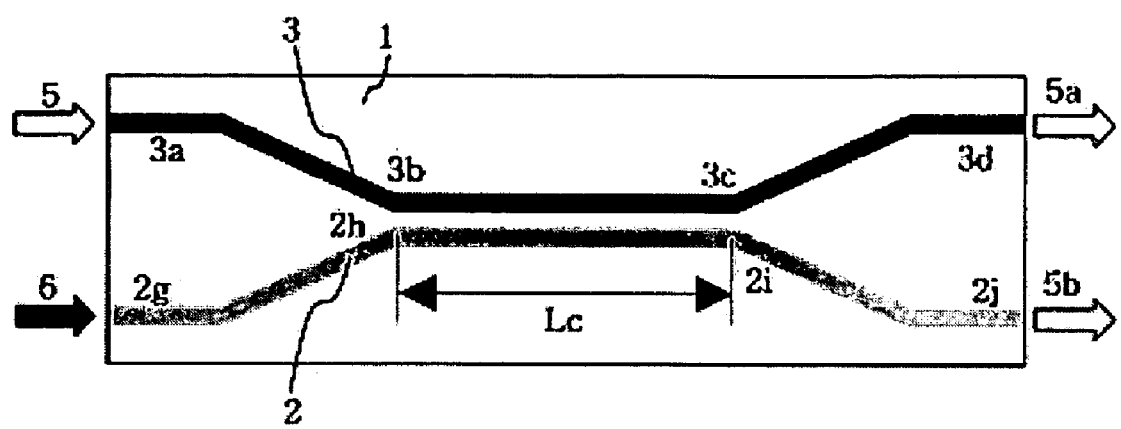
FIG. 3 is a plan view showing a waveguide type optical device, which uses a large $3^{rd}$ order nonlinear optical phenomenon in accordance with the present invention, as a directional coupler.

FIG. 3 is a plan view showing a basic concept of a waveguide type optical device in accordance with the present invention, and is a view showing a waveguide type optical device in a form of directional coupler. As shown in FIG. 3, the waveguide type optical device in a form of directional coupler includes an upper signal beam waveguide 3 and a lower pump beam waveguide 2. In the upper signal beam waveguide 3 formed of a $3^{rd}$ order nonlinear optical material which absorbs no light in a signal beam wavelength, a pump beam having a wavelength of a surface plasmon resonance cannot be guided due to a large linear absorption coefficient, and a signal beam having a wavelength at which little absorption is made by the material is guided. Meanwhile, the entire lower pump beam waveguide 2 is formed of a material which absorbs a very little light or no light in both the pump and the signal beam wavelength regions.

Figure 1:
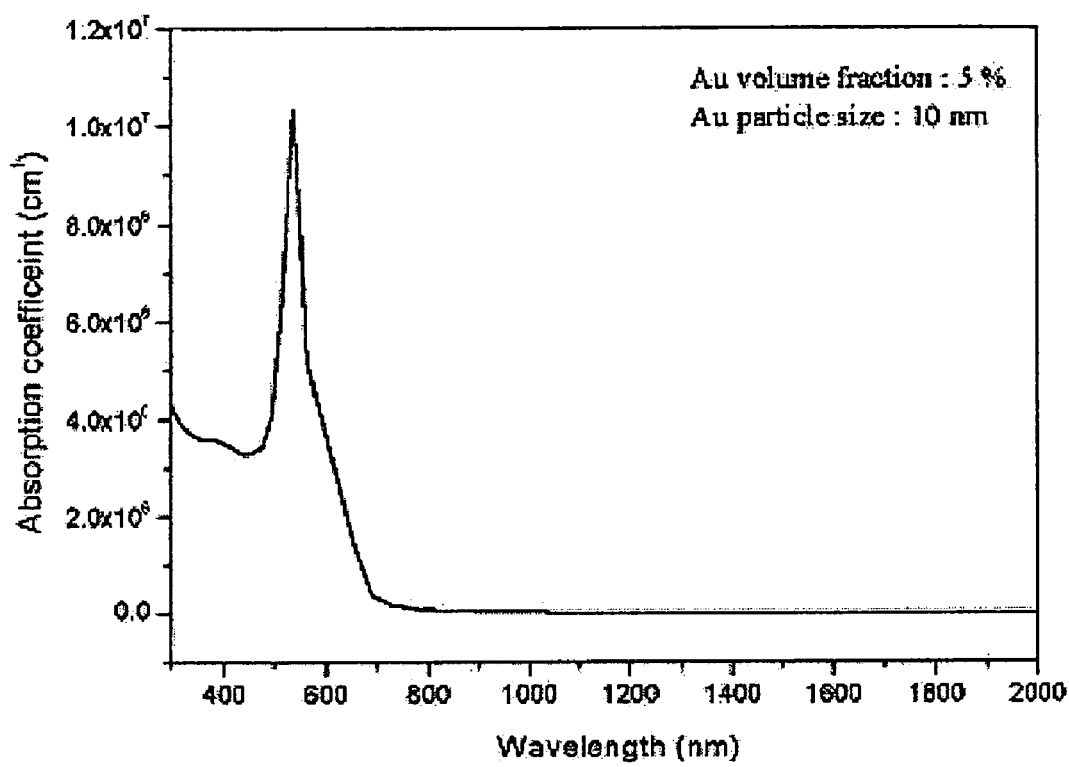
FIG. 1 is a graph showing an absorption coefficient change as a function of wavelength for a metal-dielectric nano-composite material having a large $3^{rd}$ order nonlinear optical coefficient.

If the signal beam waveguide is manufactured by using a nano-composite material ($Au-SiO_2$) obtained by dispersing gold nano-particles in a silica matrix shown in FIG. 1 as a $3^{rd}$ order nonlinear optical material, the wavelength of the pump beam would be around 500 nanometers, a surface plasmon resonance wavelength of this material, and the wavelength of the signal beam would be a generally used wavelength of an infrared light. If so, it is possible to construct a device to be achieved in the present invention. A vicinity of those waveguides 2 and 3 is constructed of a material having a refractive index slightly smaller than those of the waveguides, thereby forming a cladding layer.

If a cladding distance between the signal beam waveguide 3 and the pump beam waveguide 2 is properly controlled in a coupling section (Lc), a portion that the two waveguide are positioned adjacent each other, the pump beam 6 inserted into a pump beam input part 2g of the waveguide device starts to making power-transfer to the signal beam waveguide at a position 2h where the pump beam waveguide becomes adjacent to the upper signal beam waveguide, and the pump beam 6 propagating the pump beam waveguide 2 is coupled to the signal beam waveguide 3. At this time, the pump beam coupled to the signal beam waveguide 3 changes a refractive index of the signal beam waveguide 3 due to $3^{rd}$ order nonlinear optical effect.

The intensity of the pump beam passing through the signal beam waveguide 3 becomes weaker and weaker due to absorption, and is eventually extinguished. Meanwhile, a signal beam 5 inserted into a signal beam input part 3a is also coupled to the pump beam waveguide 3 from a spot 3b adjacent to the lower pump beam waveguide 2. However, unlike the pump beam 6, the signal beam 5 is not absorbed in both waveguides 2 and 3. For this reason, while passing through the portion (Lc) where the two waveguides are adjacent to each other, the signal beam 5 will repetitively make power transfer between the upper signal beam waveguide 3 and the lower pump beam waveguide 2 depending on the coupling length (Lc) of the waveguide and the effective refractive indices of the waveguides and cladding layer. After all, a coupling length (Lc) of the waveguides and an effective refractive index value of each waveguide determines whether the signal beam is emerged from an output part 3*d* of the signal beam waveguide or from an output part 2*j* of the pump beam waveguide.

If there is no pump beam, light inputted to the signal beam input part 3*a* comes out of the output part 3*d* of the signal beam waveguide 3. In case that the pump beam 6 is made incident on the pump beam waveguide 2, when the pump beam 6 changes a refractive index of the signal beam waveguide 3 in a coupling section (Lc) by a $3^{rd}$ order nonlinear optical effect and thus the signal beam 5 passing through the waveguide is emerged from the output part 2*j* of the lower pump beam waveguide, the optical device functions as a switching device. In addition, when the pump beam 6 is periodically modulated according to a signal to be modulated and thus the signal beam is also modulated according to the modulated pump beam, the optical device functions as an optical modulator.

Figure 2:
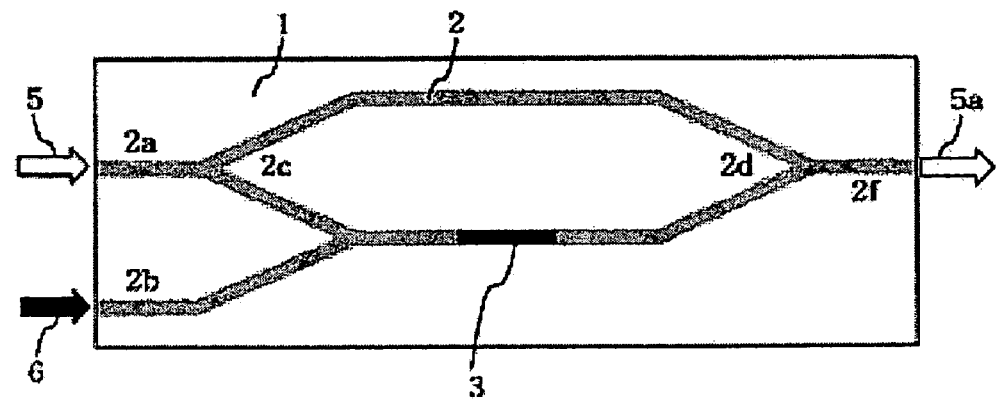
FIG. 2 is a plan view showing a concept of a conventional waveguide type optical device.

Also, because each of the signal and the pump beam waveguides 3 and 2 is made of a single material, its manufacturing process is simple compared to the conventional method shown in FIG. 2, in which different kinds of materials are inserted in one waveguide, and a problem of interface ununiformity does not occur because an interface is not formed.

Figure 4:
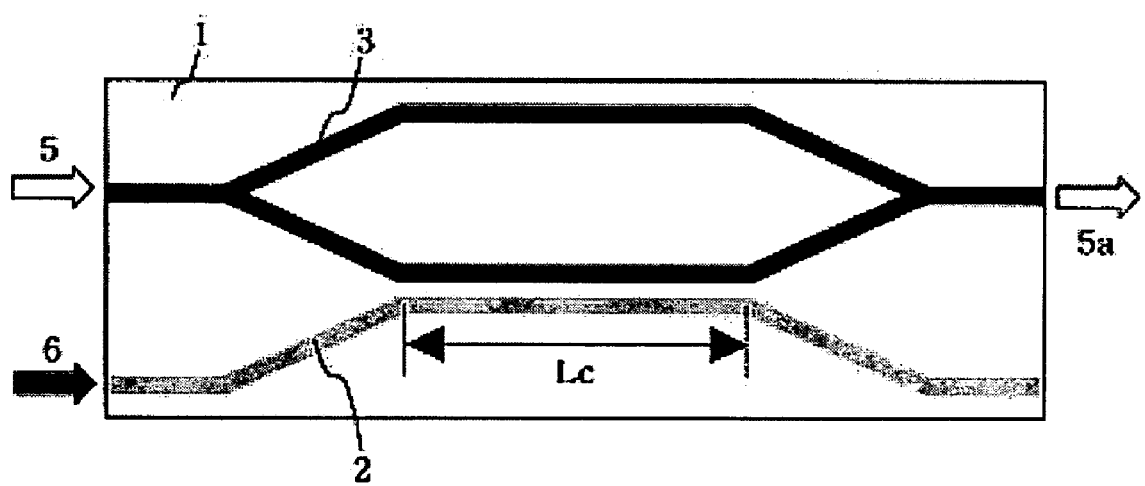
FIG. 4 is a plan view showing a waveguide type optical device, which uses a large $3^{rd}$ order nonlinear optical phenomenon in accordance with the present invention, as a Mach-Zehnder interferometer.

FIG. 4 is a plan view showing a basic concept of a waveguide type optical device in accordance with the present invention, and is a view showing an optical device employing a Mach-Zehnder interferometer type. A Mach-Zehnder interferometer type waveguide indicated by reference number 3 and provided with two arms is a signal beam waveguide. The entire signal beam waveguide 3 is made of a $3^{rd}$ order nonlinear optical material. Light having a wavelength at which no or a very little light is absorbed by the material is made incident as a signal beam 5. Also, a pump beam waveguide 2 which absorbs a very little or no light in both the signal and the pump beam wavelength regions is separately formed at the lower vicinity of the signal beam waveguide 3. As the above-mentioned case of FIG. 3, the pump beam inserted into the pump beam waveguide 2 makes power transfer to one of the arms of the Mach-Zehnder interferometer waveguide 3 made of the $3^{rd}$ order nonlinear optical material in a coupling section (Lc). Accordingly, the waveguide type optical device functions as an optical switch or an optical modulator as described above.

Figure 5A:
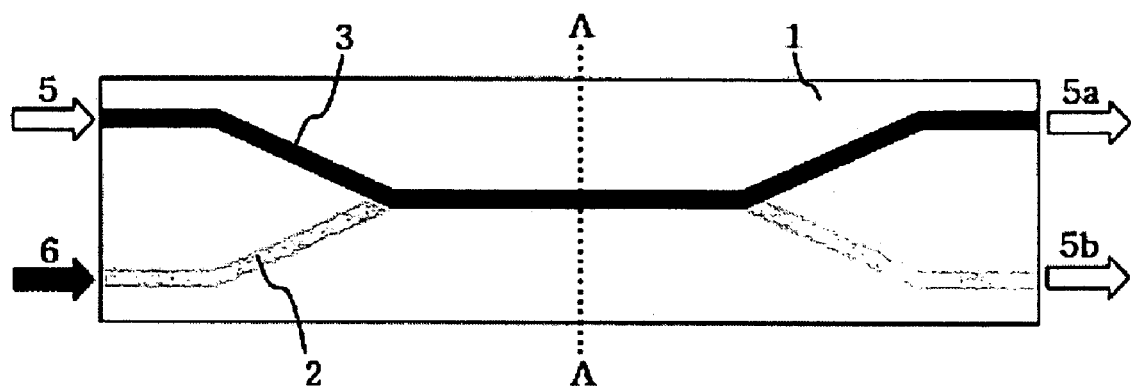
FIG. 5A is a plan view showing a waveguide type optical device, which includes a three-dimensionally constructed waveguide in accordance with the present invention, as a directional coupler.
Figure 5B:
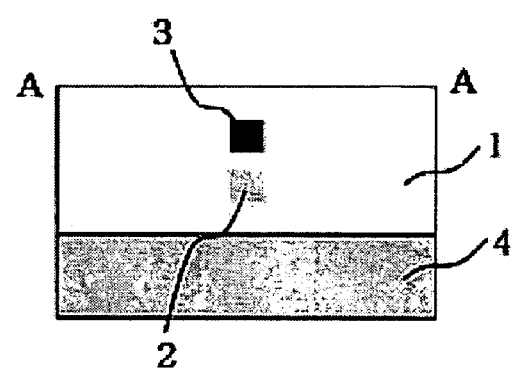
FIG. 5B is a sectional view showing a section of FIG. 5A.
Figure 6A:
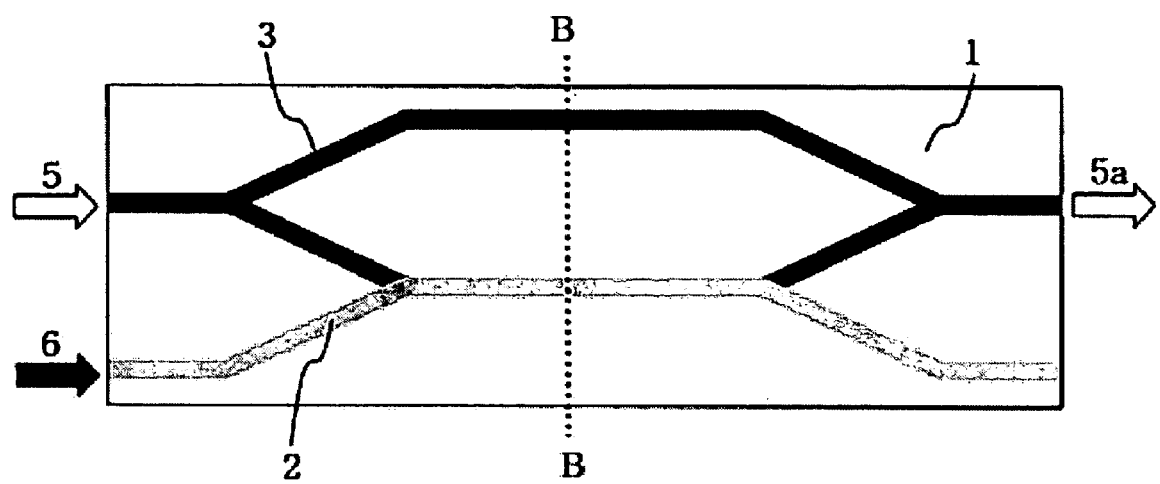
FIG. 6A is a plan view showing a waveguide type optical device, which includes a three-dimensionally constructed waveguide in accordance with the present invention, as a Mach-Zehnder interferometer.
Figure 6B:
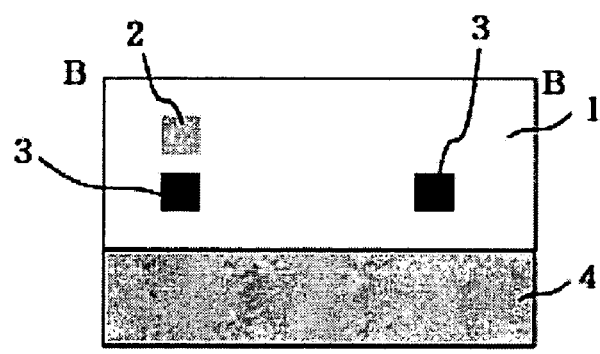
FIG. 6B is a sectional view showing a section of FIG. 6A.

In addition, a structure obtained by modifying the structures of FIGS. 2 and 3 can be used. FIGS. 5A and 6A show embodiments made by modifying the nonlinear directional coupler type optical device and the Mach-Zehnder interferometer type optical device, respectively. In those embodiments, the pump beam waveguide 2 is not disposed on the same plane with the signal beam waveguide 3, but is three-dimensionally disposed under the signal beam waveguide 3. FIG. 5B is a sectional view taken along line A—A of FIG. 5A, and FIG. 6B is a sectional view taken along line B—B of FIG. 6A. In FIG. 5B, it can be seen that the pump beam waveguide 2 is formed under the signal beam waveguide 3. In FIG. 6B, it can be seen that an arm of the Mach-Zehnder interferometer, the signal beam waveguide 3, is formed under the pump beam waveguide 2. To be sure, an opposite disposition to the disposition shown in the drawings is possible.

As above, by disposing waveguides on different planes, a problem that a distance between neighboring waveguides cannot be precisely controlled because of problems caused in mask manufacturing and exposing when the waveguides are disposed on the same plane is solved. Accordingly, a distance between the neighboring waveguides can be freely controlled with precision of nanometer, thereby enlarging a range within which an optical constant value of the hetero waveguide can be selected.

The present invention is not limited to the structure comprising a nonlinear directional coupler type waveguide or a Mach-Zehnder interferometer type waveguide using a $3^{rd}$ order nonlinear optical phenomenon; and a pump beam waveguide coupled therein.

In the present invention, as for a waveguide type optical device using a $3^{rd}$ order nonlinear optical phenomenon, a $3^{rd}$ order nonlinear optical material absorbing a very little amount of light or no light in signal beam wavelength ranges and generating a large $3^{rd}$ order nonlinear optical phenomenon in pump beam wavelength ranges is used for the signal beam waveguide, and a general optical waveguide material which absorbs a very little amount of light or no light in wavelength ranges of both the pump and the signal beam is used for the pump beam waveguide. The two waveguides are formed adjacent to each other to make coupling possible, thereby resulting in a $3^{rd}$ order nonlinear optical phenomenon due to the coupling of the pump beam to the signal waveguide. Accordingly, the waveguide type optical device can be applied for every modified structure in which it works as an optical device.

In addition, as an example of a material generating a large $3^{rd}$ order nonlinear optical phenomenon, a nano-composite material obtained by dispersing metal or semiconductor nano-particles in a dielectric or semiconductor matrix, which absorbs light in a wavelength region of a pump beam, has been described. However, as a material applicable to the present invention, every material absorbing a light in a wavelength region of a pump beam which greatly generates a $3^{rd}$ order nonlinear optical phenomenon and absorbing a very little or no light in a signal beam wavelength region, such as a transition metal oxide, a ferroelectric oxide, a polymer material or the like, can be used.

As specific examples of such materials, in case of the nano-composite material, the metal particles are selected from Au, Ag, Cu, Al, In, Sn, Pb, Sb, Ti, V, Cr, Mn, Fe, Co, Ni, Zr, Nb, Mo, Ru, Rh, Pd, Ta, W and Pt, alloys thereof, and the semiconductor particles are selected from semiconductors such as Si, Ge, CdS, CdTe, CuBr, AgBr, CuCl, InP, GaP, GaAs, InAs and the like, solid solutions thereof and compounds thereof.

As a material of a matrix, used are an inorganic material selected from oxide dielectrics which are optically transparent in a wavelength region to be used (wavelengths of signal beam and pump beam) such as $SiO_2$, $Al_2O_3$, $Y_2O_3$, $BeO$, $MgO$, $ZnO$, $SnO$ and the like, transition metal oxides such as $TiO_2$, $ZrO_2$, $WO_3$, $V_{2O3}$, $Ta_2O_5$ and the like, ferroelectric oxides such as $BaTiO_3$, $PbTiO_3$ and the like, nitrides such as $Si_3N_4$, $AlN$ and the like, phosphides such as $InP$, $GaP$ and the like, chalcogenides such as $ZnS$, $ZnSe$, $ZnTe$, $As_2S_3$ and the like, and fluorides such as $MgF_2$, $CaF_2$, $NaF$, $BaF_2$, $PbF_2$, $LiF$, $LaF$ and the like, and mixtures of those oxides, nitrides, phosphides, chalcogenides and fluorides; and an organic material such as polycarbonate, polymethyl methacrylate (PMMA) and the like.

The materials of the matrix and polymer materials such as chalcogenides including sulfides, selenides, telurides, poly-p-phenylenebenzobisthiazole, azobenzene-doped polymer or the like, which has been reported to have a large $3^{rd}$ order nonlinear optical coefficient can be used for a waveguide optical device structure in accordance with the present invention as a single material not as a composite material containing nano-particles.

As so far described, in the waveguide optical device using a $3^{rd}$ order nonlinear optical phenomenon, there is no need to insert different kinds of materials into a single waveguide as proposed in the conventional art. Accordingly, manufacturing processes for a general waveguide can be easily carried out, overcoming difficulties in manufacturing process according to the conventional art. Also, unmatched refractive indexes and a signal beam loss due to ununiformity of an interface can be prevented, so that the waveguide optical device can implement functions of an all-optical communication device, such as optical modulation and optical switching by light.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical device using a $3_{rd}$ order nonlinear optical phenomenon, comprising:
   a signal beam waveguide through which a signal beam propagates, said signal beam waveguide being formed of a nano-composite material made by dispersing metal nano-particles in a dielectric or polymer matrix of a nonlinear optical material having a large $3_{rd}$ order nonlinear optical coefficient, absorbing a very small amount of light in a wavelength range of the signal beam, and generating a large $3_{rd}$ order nonlinear optical phenomenon in a wavelength range of a pump beam; and
   a pump beam waveguide through which the pump beam propagates, said pump beam waveguide being formed of a material absorbing very little or no light in both the signal and the pump beam wavelength ranges,
   wherein at least a part of the pump beam waveguide is arranged adjacent to at least a part of the signal beam waveguide so that the pump beam can be coupled to the signal beam waveguide, the signal beam waveguide and the pump beam waveguide are made of different kinds of materials, and the signal beam and the pump beam are different in their wavelength regions.

2. The device of claim 1, wherein the signal beam waveguide and the pump beam waveguide are constructed in a directional coupler type.

3. The device of claim 1, wherein the signal beam waveguide is constructed in a Mach-Zehnder interferometer type having two arms; and the pump beam waveguide is formed adjacent to one arm of the signal beam waveguide.

4. The device of claim 2, wherein the pump beam waveguide is formed on a different plane from a plane of the signal beam waveguide, so that a thickness of a cladding layer between the two waveguides is controlled to thereby control coupling efficiency.

5. A method for operating an optical device using a $3_{rd}$ order nonlinear optical phenomenon, the method comprising:
   making a signal beam and a pump beam, each having a different wavelength range, incident on the optical device including a signal beam waveguide through which a signal beam propagates and a pump beam waveguide through which a pump beam propagates, said signal beam waveguide being formed of a nano-composite material made by dispersing metal nano-particles in a dielectric or polymer matrix of a nonlinear optical material having a large $3_{rd}$ order nonlinear optical coefficient, absorbing a very little amount of light in a wavelength range of the signal beam, and generating a large $3_{rd}$ order nonlinear optical phenomenon in a wavelength range of a pump beam, and said pump beam waveguide being formed of a material absorbing a very little or no light in both the signal and the pump beam wavelength ranges,
   wherein the pump beam waveguide is disposed adjacent to the signal beam waveguide so that the pump beam can be coupled to the signal beam waveguide, and the signal beam and the pump beam waveguides are made of different kinds of materials.

6. The method of claim 5, wherein the signal beam waveguide and the pump beam waveguide are constructed in a directional coupler type.

7. The method of claim 5, wherein the signal beam waveguide is constructed in a Mach-Zehnder interferometer type having two arms; and the pump beam waveguide is formed adjacent to one arm of the signal beam waveguide.

8. The method of claim 6, wherein the pump beam waveguide is constructed on a different plane from a plane of the signal beam waveguide, so that a thickness of a cladding layer between the two waveguides is controlled to thereby control coupling efficiency.

* * * * *